US 9,489,416 B2

(12) United States Patent
Hanna et al.

(10) Patent No.: US 9,489,416 B2
(45) Date of Patent: *Nov. 8, 2016

(54) SCALABLE SEARCHING OF BIOMETRIC DATABASES USING DYNAMIC SELECTION OF DATA SUBSETS

(71) Applicant: Eyelock, Inc., Tolima Valley Caguas, PR (US)

(72) Inventors: Keith J. Hanna, Princeton Junction, NJ (US); Hector T. Hoyos, New York, NY (US)

(73) Assignee: Eyelock LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/720,403

(22) Filed: Dec. 19, 2012

(65) Prior Publication Data
US 2013/0110859 A1 May 2, 2013

Related U.S. Application Data

(63) Continuation of application No. 11/713,894, filed on Mar. 5, 2007, now Pat. No. 8,364,646.

(60) Provisional application No. 60/767,114, filed on Mar. 3, 2006.

(51) Int. Cl.
*G06F 17/30* (2006.01)
*G06K 9/00* (2006.01)

(52) U.S. Cl.
CPC ..... *G06F 17/30386* (2013.01); *G06K 9/00885* (2013.01); *G06K 9/00979* (2013.01)

(58) Field of Classification Search
None
See application file for complete search history.

(56) References Cited

U.S. PATENT DOCUMENTS

| 4,641,349 A | 2/1987 | Flom et al. |
| 5,259,040 A | 11/1993 | Hanna |

(Continued)

FOREIGN PATENT DOCUMENTS

| WO | WO-2010/062371 | 6/2010 |
| WO | WO-2011/093538 | 8/2011 |

OTHER PUBLICATIONS

John Daugman, "How Iris Recognition Works," IEEE Transaction on Circuits and Systems for Video Technology, vol. 14, No. 1, pp. 21-30 (Jan. 2004).

(Continued)

*Primary Examiner* — Bai D. Vu
(74) *Attorney, Agent, or Firm* — Foley & Lardner LLP; John D. Lanza

(57) ABSTRACT

A method of searching a biometric database includes storing biometric data corresponding to a number of users in a database, and defining one or more data subsets in the database according to inputs from users expecting to pass through a given biometric acquisition device that is linked with the database within a certain time period. A search initiated by the given acquisition device at a given time is then scaled down to only those data subsets defined by the inputs from those users expecting to pass through the acquisition device at the given time. This modification of the database and database search is performed continuously and automatically based on dynamic information provided by other automatic and/or manual systems, and then optionally the information on the databases can be automatically modified or deleted based either on a biometric match result or based on rules encoded in the database records.

18 Claims, 2 Drawing Sheets

(56) References Cited

U.S. PATENT DOCUMENTS

| | | | |
|---|---|---|---|
| 5,291,560 A | 3/1994 | Daugman | |
| 5,488,675 A | 1/1996 | Hanna | |
| 5,572,596 A | 11/1996 | Wildes | |
| 5,581,629 A | 12/1996 | Hanna et al. | |
| 5,613,012 A | 3/1997 | Hoffman et al. | |
| 5,615,277 A | 3/1997 | Hoffman | |
| 5,737,439 A | 4/1998 | Lapsley et al. | |
| 5,751,836 A | 5/1998 | Wildes | |
| 5,764,789 A | 6/1998 | Pare et al. | |
| 5,802,199 A | 9/1998 | Pare et al. | |
| 5,805,719 A | 9/1998 | Pare et al. | |
| 5,838,812 A | 11/1998 | Pare et al. | |
| 5,901,238 A | 5/1999 | Matsushita | |
| 5,953,440 A | 9/1999 | Zhang et al. | |
| 5,978,494 A | 11/1999 | Zhang | |
| 6,021,210 A | 2/2000 | Camus et al. | |
| 6,028,949 A | 2/2000 | McKendall | |
| 6,055,322 A | 4/2000 | Salganicoff | |
| 6,064,752 A | 5/2000 | Rozmus et al. | |
| 6,069,967 A | 5/2000 | Rozmus et al. | |
| 6,070,159 A * | 5/2000 | Wilson et al. | |
| 6,088,470 A | 7/2000 | Camus | |
| 6,144,754 A | 11/2000 | Okano et al. | |
| 6,182,076 B1 * | 1/2001 | Yu et al. | 713/186 |
| 6,192,142 B1 | 2/2001 | Pare et al. | |
| 6,246,751 B1 | 6/2001 | Bergl et al. | |
| 6,247,813 B1 | 6/2001 | Kim et al. | |
| 6,252,977 B1 | 6/2001 | Salganicoff et al. | |
| 6,289,113 B1 | 9/2001 | McHugh et al. | |
| 6,341,169 B1 * | 1/2002 | Cadorette et al. | 382/115 |
| 6,366,682 B1 | 4/2002 | Hoffman et al. | |
| 6,373,968 B2 | 4/2002 | Okano et al. | |
| 6,377,699 B1 | 4/2002 | Musgrave et al. | |
| 6,424,727 B1 | 7/2002 | Musgrave et al. | |
| 6,483,930 B1 | 11/2002 | Musgrave et al. | |
| 6,532,298 B1 | 3/2003 | Cambier et al. | |
| 6,542,624 B1 | 4/2003 | Oda | |
| 6,546,121 B1 | 4/2003 | Oda | |
| 6,554,705 B1 | 4/2003 | Cumbers | |
| 6,594,376 B2 | 7/2003 | Hoffman et al. | |
| 6,594,377 B1 | 7/2003 | Kim et al. | |
| 6,652,099 B2 | 11/2003 | Chae et al. | |
| 6,700,998 B1 | 3/2004 | Murata | |
| 6,714,665 B1 | 3/2004 | Hanna | |
| 6,760,467 B1 | 7/2004 | Min et al. | |
| 6,819,219 B1 | 11/2004 | Bolle et al. | |
| 6,850,631 B1 | 2/2005 | Oda et al. | |
| 6,917,695 B2 | 7/2005 | Teng et al. | |
| 6,944,318 B1 | 9/2005 | Takata et al. | |
| 6,950,536 B2 | 9/2005 | Houvener | |
| 6,980,670 B1 | 12/2005 | Hoffman et al. | |
| 6,985,608 B2 | 1/2006 | Hoffman et al. | |
| 7,007,298 B1 | 2/2006 | Shinzaki et al. | |
| 7,020,351 B1 | 3/2006 | Kumar | |
| 7,047,418 B1 | 5/2006 | Ferren et al. | |
| 7,069,444 B2 * | 6/2006 | Lowensohn et al. | 713/185 |
| 7,095,901 B2 | 8/2006 | Lee et al. | |
| 7,146,027 B2 | 12/2006 | Kim et al. | |
| 7,152,782 B2 | 12/2006 | Shenker et al. | |
| 7,248,719 B2 | 7/2007 | Hoffman et al. | |
| 7,271,939 B2 | 9/2007 | Kono | |
| 7,277,891 B2 * | 10/2007 | Howard et al. | 707/707 |
| 7,346,472 B1 | 3/2008 | Moskowitz et al. | |
| 7,385,626 B2 | 6/2008 | Aggarwal et al. | |
| 7,398,925 B2 | 7/2008 | Tidwell et al. | |
| 7,414,737 B2 | 8/2008 | Cottard et al. | |
| 7,418,115 B2 | 8/2008 | Northcott et al. | |
| 7,428,320 B2 | 9/2008 | Northcott et al. | |
| 7,542,590 B1 | 6/2009 | Robinson et al. | |
| 7,545,962 B2 | 6/2009 | Peirce et al. | |
| 7,558,406 B1 | 7/2009 | Robinson et al. | |
| 7,558,407 B2 | 7/2009 | Hoffman et al. | |
| 7,574,021 B2 | 8/2009 | Matey | |
| 7,583,822 B2 | 9/2009 | Guillemot et al. | |
| 7,606,401 B2 | 10/2009 | Hoffman et al. | |
| 7,616,788 B2 | 11/2009 | Hsieh et al. | |
| 7,639,840 B2 | 12/2009 | Hanna et al. | |
| 7,660,700 B2 | 2/2010 | Moskowitz et al. | |
| 7,693,307 B2 | 4/2010 | Rieul et al. | |
| 7,697,786 B2 | 4/2010 | Camus et al. | |
| 7,715,595 B2 | 5/2010 | Kim et al. | |
| 7,719,566 B2 | 5/2010 | Guichard | |
| 7,770,019 B2 | 8/2010 | Ferren et al. | |
| 7,797,606 B2 | 9/2010 | Chabanne | |
| 7,801,335 B2 | 9/2010 | Hanna | |
| 7,802,724 B1 * | 9/2010 | Nohr | 235/384 |
| 7,847,688 B2 | 12/2010 | Bernard et al. | |
| 7,869,627 B2 | 1/2011 | Northcott et al. | |
| 7,925,059 B2 | 4/2011 | Hoyos et al. | |
| 7,929,017 B2 | 4/2011 | Aggarwal | |
| 7,929,732 B2 | 4/2011 | Bringer et al. | |
| 7,949,295 B2 | 5/2011 | Kumar | |
| 7,949,494 B2 | 5/2011 | Moskowitz et al. | |
| 7,978,883 B2 | 7/2011 | Rouh et al. | |
| 8,009,876 B2 | 8/2011 | Kim et al. | |
| 8,025,399 B2 | 9/2011 | Northcott et al. | |
| 8,028,896 B2 | 10/2011 | Carter et al. | |
| 8,090,246 B2 | 1/2012 | Jelinek | |
| 8,092,021 B1 | 1/2012 | Northcott et al. | |
| 8,132,912 B1 | 3/2012 | Northcott et al. | |
| 8,159,328 B2 | 4/2012 | Luckhardt | |
| 8,170,295 B2 | 5/2012 | Fujii et al. | |
| 8,181,858 B2 | 5/2012 | Carter et al. | |
| 8,195,044 B2 | 6/2012 | Hanna | |
| 8,212,870 B2 | 7/2012 | Hanna | |
| 8,214,175 B2 | 7/2012 | Moskowitz et al. | |
| 8,233,680 B2 | 7/2012 | Bringer et al. | |
| 8,243,133 B1 | 8/2012 | Northcott et al. | |
| 8,260,008 B2 | 9/2012 | Hanna | |
| 8,279,042 B2 | 10/2012 | Beenau et al. | |
| 8,280,120 B2 | 10/2012 | Hoyos | |
| 8,289,390 B2 | 10/2012 | Aggarwal | |
| 8,306,279 B2 | 11/2012 | Hanna | |
| 8,317,325 B2 | 11/2012 | Raguin et al. | |
| 8,364,646 B2 | 1/2013 | Hanna et al. | |
| 8,411,909 B1 | 4/2013 | Zhao et al. | |
| 8,442,339 B2 | 5/2013 | Martin et al. | |
| 8,443,202 B2 | 5/2013 | White et al. | |
| 8,553,948 B2 | 10/2013 | Hanna | |
| 8,604,901 B2 | 12/2013 | Hoyos | |
| 8,606,097 B2 | 12/2013 | Hanna | |
| 2002/0034319 A1 * | 3/2002 | Tumey et al. | 382/116 |
| 2004/0258281 A1 * | 12/2004 | Delgrosso et al. | 382/115 |
| 2005/0084137 A1 | 4/2005 | Kim et al. | |
| 2005/0084179 A1 | 4/2005 | Hanna | |
| 2005/0229007 A1 * | 10/2005 | Bolle et al. | 713/186 |
| 2006/0028552 A1 | 2/2006 | Aggarwal | |
| 2006/0073449 A1 | 4/2006 | Kumar | |
| 2006/0074986 A1 | 4/2006 | Mallalieu et al. | |
| 2006/0206722 A1 * | 9/2006 | Zhang | 713/186 |
| 2006/0279630 A1 | 12/2006 | Aggarwal | |
| 2007/0110285 A1 | 5/2007 | Hanna | |
| 2007/0198848 A1 * | 8/2007 | Bjorn | 713/186 |
| 2007/0206839 A1 | 9/2007 | Hanna | |
| 2007/0211922 A1 | 9/2007 | Crowley et al. | |
| 2007/0288758 A1 * | 12/2007 | Weiss | 713/186 |
| 2008/0122578 A1 | 5/2008 | Hoyos | |
| 2008/0290991 A1 * | 11/2008 | Luling | 340/5.82 |
| 2008/0291279 A1 | 11/2008 | Samarasekera | |
| 2009/0074256 A1 | 3/2009 | Haddad | |
| 2009/0097715 A1 | 4/2009 | Cottard et al. | |
| 2009/0161925 A1 | 6/2009 | Cottard et al. | |
| 2009/0231096 A1 | 9/2009 | Bringer et al. | |
| 2009/0274345 A1 | 11/2009 | Hanna | |
| 2010/0014720 A1 | 1/2010 | Hoyos | |
| 2010/0021016 A1 | 1/2010 | Cottard et al. | |
| 2010/0074477 A1 | 3/2010 | Fujii et al. | |
| 2010/0127826 A1 | 5/2010 | Saliba et al. | |
| 2010/0232655 A1 | 9/2010 | Hanna | |
| 2010/0246903 A1 | 9/2010 | Cottard | |
| 2010/0253816 A1 | 10/2010 | Hanna | |
| 2010/0278394 A1 | 11/2010 | Raguin et al. | |
| 2010/0310070 A1 | 12/2010 | Bringer et al. | |
| 2011/0002510 A1 | 1/2011 | Hanna | |

(56) References Cited

U.S. PATENT DOCUMENTS

| | | |
|---|---|---|
| 2011/0007949 A1 | 1/2011 | Hanna |
| 2011/0119111 A1 | 5/2011 | Hanna |
| 2011/0119141 A1 | 5/2011 | Hoyos |
| 2011/0158486 A1 | 6/2011 | Bringer et al. |
| 2011/0194738 A1 | 8/2011 | Choi et al. |
| 2011/0211054 A1 | 9/2011 | Hanna |
| 2011/0277518 A1 | 11/2011 | Lais et al. |
| 2012/0127295 A9 | 5/2012 | Hanna |
| 2012/0187838 A1 | 7/2012 | Hanna |
| 2012/0212597 A1 | 8/2012 | Hanna |
| 2012/0219279 A1 | 8/2012 | Hanna |
| 2012/0239458 A9 | 9/2012 | Hanna |
| 2012/0240223 A1 | 9/2012 | Tu |
| 2012/0242820 A1 | 9/2012 | Hanna |
| 2012/0242821 A1 | 9/2012 | Hanna |
| 2012/0243749 A1 | 9/2012 | Hanna |
| 2012/0257797 A1 | 10/2012 | Leyvand et al. |
| 2012/0268241 A1 | 10/2012 | Hanna |
| 2012/0293643 A1 | 11/2012 | Hanna |
| 2012/0300052 A1 | 11/2012 | Hanna |
| 2012/0300990 A1 | 11/2012 | Hanna |
| 2012/0321141 A1 | 12/2012 | Hoyos |
| 2012/0328164 A1 | 12/2012 | Hoyos |
| 2013/0051631 A1 | 2/2013 | Hanna |
| 2013/0162798 A1 | 6/2013 | Hanna |
| 2013/0162799 A1 | 6/2013 | Hanna |
| 2013/0182093 A1 | 7/2013 | Hanna |
| 2013/0182094 A1 | 7/2013 | Hanna |
| 2013/0182095 A1 | 7/2013 | Hanna |
| 2013/0182913 A1 | 7/2013 | Hoyos |
| 2013/0182915 A1 | 7/2013 | Hanna |
| 2013/0194408 A1 | 8/2013 | Hanna |
| 2013/0212655 A1 | 8/2013 | Hoyos |
| 2013/0294659 A1 | 11/2013 | Hanna |
| 2014/0064574 A1 | 3/2014 | Hanna |
| 2014/0072183 A1 | 3/2014 | Hanna |

OTHER PUBLICATIONS

B Galvin, et al., Recovering Motion Fields: An Evaluation of Eight Optical Flow Algorithms, Proc. of the British Machine Vision Conf. (1998).

J. R. Bergen, et al., Hierarchical Model-Based Motion Estimation, European Conf. on Computer Vision (1993).

K. Nishino, et al., The World in an Eye, IEEE Conf. on Pattern Recognition, vol. 1, at pp. 444-451 (Jun. 2004).

Notice of Allowance on U.S. Appl. No. 11/559,381 dated May 18, 2010.

R. Kumar, et al., Direct recovery of shape from multiple views: a parallax based approach, 12th IAPR Int'l Conf. on Pattern Recognition.

R. P. Wildes, Iris Recognition: An Emerging Biometric Technology, Proc. IEEE 85(9) at pp. 1348-1363 (Sep. 1997).

Notice of Allowance in U.S. Appl. No. 11/713,894 dated Oct. 19, 2012.

Office Action in U.S. Appl. No. 11/713,894 dated Nov. 28, 2011.

Office Action in U.S. Appl. No. 11/713,894 dated May 3, 2012.

\* cited by examiner

SCALABLE SEARCHING OF BIOMETRIC DATABASES USING DYNAMIC SELECTION OF DATA SUBSETS

CROSS REFERENCE TO RELATED APPLICATIONS

This application is a continuation under 35 U.S.C. §120 of U.S. application Ser. No. 11/713,894, filed on Mar. 5, 2007, now U.S. Pat. No. 8,364,646 B2, which in turn claims priority under 35 U.S.C. §119(e) of U.S. Provisional Patent Application No. 60/767,114 filed Mar. 3, 2006, in the names of the present inventors and entitled "Method for Scalable Search of Biometric Databases by Dynamic Selection of a Subset of the Database".

BACKGROUND OF THE INVENTION

1. Field of the Invention

This invention relates to biometric data processing and retrieval.

2. Discussion of the Known Art

Biometrics is concerned with measurements of human characteristics, such as the unique pattern of a person's iris or fingerprint, or locations of features on the person's face. Measurements may be recorded at one instant of time, stored in a database, and then compared with new measurements taken and recorded at a later time. An example of a method for computing a biometric measurement is described in U.S. Pat. No. 5,291,560 "Biometric personal identification system based on iris analysis".

For security applications involving, e.g., access control or identification of individual passengers at airport terminals, biometrics has the advantage that it is difficult or impossible to transfer one individual's biometric measurements to a second individual. On the other hand, tokens such as entry keys can be easily passed between individuals.

The ability of biometric measurements to differentiate one person from another depends on conditions under which measurements are recorded, as well as on the biometric itself. For example, it has been shown that the human iris is highly unique and therefore can be used to identify a single person even within a relatively large database. In the case of an iris biometric, studies have shown that the size of an iris database may have up to 1.2 million records and still allow for a unique match. In the case of a face biometric, the corresponding database must typically be orders of magnitude smaller for optimal performance. Also, the larger the biometric database, the longer any system takes to search through it.

Scalability may not be a problem when a particular biometric deployment has a small number of enrollees, but as biometric technologies become more widespread, there is a need for a process to maintain a database with a large number of enrollees that will enable a unique matching capability and at the same time be convenient for the user.

An approach taken toward resolving the problem of scalability of large biometric databases has been to use a smart card or a swipe card at or near a given biometric device. The concept is that unique biometric information contained in the smart card or swipe card essentially reduces the "database" to a size of just one. While the approach appears attractive from the viewpoint of the biometric matching, there unfortunately is a cost to issuing and maintaining smart/swipe cards, and further, such cards are inconvenient for users and slows down throughput at the biometric device.

Biometrics may be applied in two ways, namely, (i) verification, wherein a separate token is used to locate a single candidate record in a biometric database with which acquired biometric data is compared, and (ii) recognition, wherein a separate token is not used, and user data is acquired on site by a biometric device and then compared with all records in a database. Advantages of the recognition approach are that the user does not need to carry a token, the system operator does not have to manage issuance or loss of the token, and the throughput of users through a biometric system is not slowed by having to follow a process in which a token must be read. Disadvantages of the recognition approach compared to verification are that more processing must be performed in searching through a database, and the volume of data transmitted between the database and a matching processor is much larger and thus may overcome the capacity of a network if several biometric acquisition devices are installed in the network, resulting in an unacceptable response time. Further, even a momentary failure in the network between the matching processor and the database can result in an immediate system failure. Methods have been developed that attempt to improve the efficiency of storage and search through a large database, for example, U.S. Pat. No. 6,070,159 "Method and Apparatus for Expandable Biometric Searching".

It is typical in access control and other security applications that the rate at which user data is added to a database is much smaller than the rate at which users are scanned and the database is searched. This means that the contents of the database are relatively static, and that the processes in place for managing the database (e.g., adding or deleting records) are essentially manual. Therefore, the database management can be inefficient and difficult to administer in certain applications where the throughput of users is very high compared to other applications, e.g., the identification of passengers at airport terminals or of visitors entering buildings.

SUMMARY OF THE INVENTION

According to one aspect of the invention, a method of searching a biometric database includes storing biometric data corresponding to a number of users in a common database, defining one or more data subsets in the database according to inputs from users expecting to pass through a given biometric acquisition device that is linked with the database within a certain time period, and scaling a search initiated by the given acquisition device at a given time to only those data subsets defined by the inputs from those users expecting to pass through the acquisition device at the given time.

According to another aspect of the invention, a method of searching a first biometric database includes storing biometric data corresponding to a number of users in a second database, defining one or more data subsets in the second database according to inputs from users expecting to pass through a given biometric acquisition device that is linked with the first database within a certain time period, transmitting the data subsets from the second database to the first database, and scaling a search initiated by the given acquisition device at a given time to only the data subsets contained in the first database as defined by the inputs from those users expecting to pass through the acquisition device at the given time.

In another aspect of the invention, we describe a scalable, fault-tolerant biometric matching system that automatically and continually distributes data to local databases attached to multiple biometric acquisition devices based on dynamic information provided by other automatic and/or manual systems, and then optionally automatically modifies or deletes the information on the local databases based either on a biometric match result or based on rules encoded in the database records.

For a better understanding of the invention, reference is made to the following description taken in conjunction with the accompanying drawing and the appended claims.

DETAILED DESCRIPTION OF THE INVENTION

Figure 1:
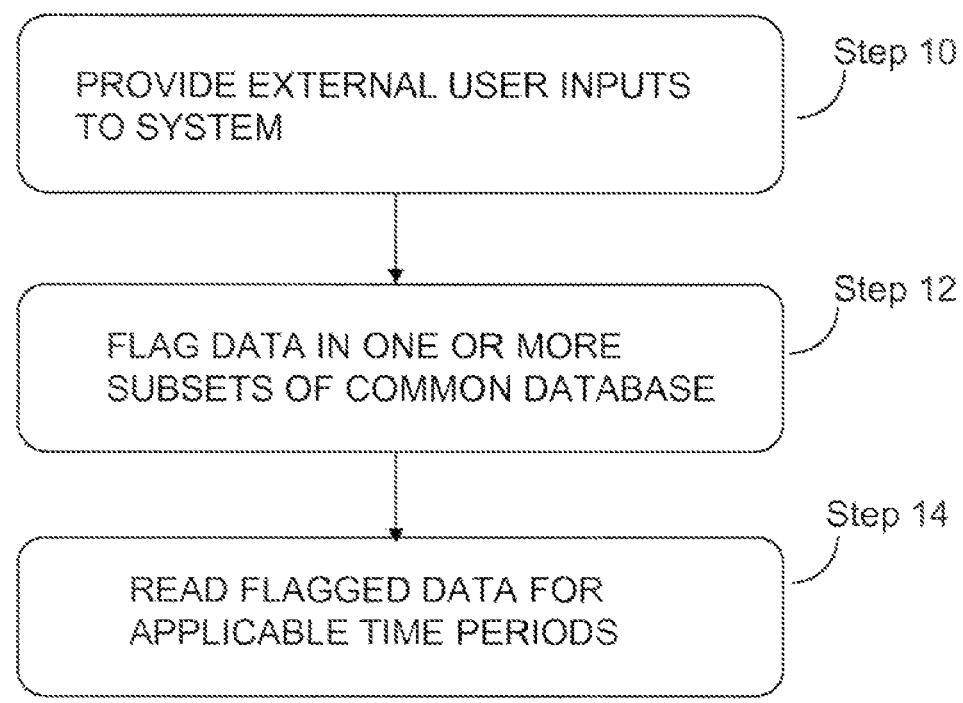
FIG. 1 is a flow chart showing steps of a first embodiment of the invention.

FIG. 1 depicts a first embodiment of a scalable biometric database searching technique according to the invention. Rather than attempt to search through an entire biometric database, or retrieve and match an individual biometric record based on a smart card or a swipe card held by a user, searching is performed only with respect to one or more subsets of the database which subsets are defined according to certain external inputs which may be manual or automatic as defined below. Specifically the subsets are defined and selected dynamically as opposed to a fixed segregation of the database based, e.g., on geographic region, company, or other fixed attribute.

In step 10, external inputs are provided to a biometric data processing system so as to identify candidate subjects (users) who may or may not pass through one or more biometric devices or readers that share a common database of the system within a given time period. The input does not need to be provided physically at a given biometric reader, nor does it need to be provided concurrently when the biometric reading is being performed.

For example, in an airport traveler application, a given traveler may dial a phone number, and a unique originating phone number of the traveler is used to flag the traveler's biometric record (which includes his/her phone number) in the database. Many other travelers may also repeat the same process, each with their own unique originating phone number and each subsequently flagging their record in the database.

In step 12, the common database maintains the flagged data in one or more subsets for a certain period of time which may vary depending on the application, for example, 1 to 2 days. A given biometric reader in the system may then be alerted to the fact that one or more travelers whose data has been flagged in the database, may be present at the given reader within the 1 to 2 day period. After the 1 to 2 day period, the flags are reset automatically. Thus, in step 14, when the travelers present themselves at the reader within the set period, the system only searches through a subset of the database containing biometric records that were dynamically flagged by those travelers expected to pass through the reader during the same period. Accordingly, there is only a requirement to search a subset of the database at any one time.

The above technique is not limited just to telephone dial-in inputs. Other user or traveler input methods may be used such as, for example, via an Internet web page or by e-mail. Nor does the input have to originate from the user. For example, an e-mail or other message can be sent to users to inform them of a temporary Personal Identification Number (PIN). The PIN could also be printed on their travel ticket. Even if the PIN is only four digits long, the database subset size can be 10,000 smaller than the original database size. This particular PIN approach is much more secure than current PIN approaches since the PIN is dynamic and not fixed.

Figure 2:
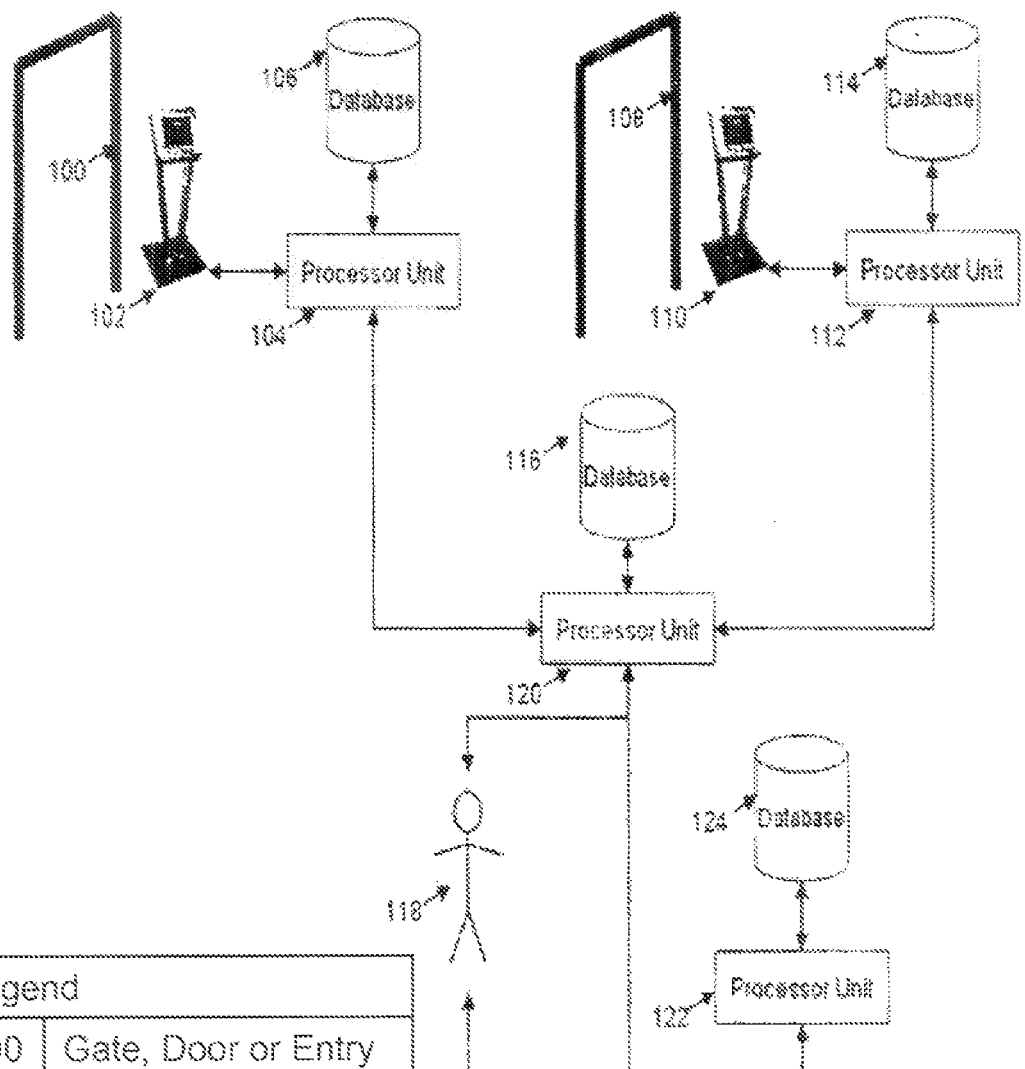
FIG. 2 is a schematic block diagram of a biometric data processing and retrieval system according to a second embodiment of the invention.

FIG. 2 depicts a second embodiment of a scalable biometric database searching technique according to the invention. In FIG. 2, a scalable, fault-tolerant biometric matching system automatically and continually distributes data to local databases 106, 114 associated with corresponding biometric acquisition devices 102, 110, based on dynamic information provided by other automatic and/or manual systems. The information at the local databases 106, 114 may optionally be automatically modified or deleted the information based either on a biometric match result, or based on rules encoded in the database records.

A biometric acquisition device 102, 110 is optionally located, for example, near an airport entry door, airport boarding gate, or an associated building entry 100, 108. The acquisition devices 102, 110 are connected to corresponding biometric processor units 104, 112, and the processor units 104, 112 are connected to their associated local databases 106, 114. Additional processor units and biometric acquisition devices may be connected in this manner. Two biometric acquisition devices and processor units are shown in FIG. 2 for illustrative purposes only and without intending to limit the scope of the invention.

The processor unit 104 and the local database 106 are connected by a high reliability link and may physically reside together. For example, the database 106 may reside in Dynamic Random Access Memory (DRAM) that is directly addressed by the processor unit 104. Similarly, the biometric acquisition device 102 and the processor unit 104 are also connected by a high-reliability link, for example, an RS-232 link or a PCI bus interface. As discussed below, the use of the local database together with high reliability local links allows the overall system to maintain operation for a certain time period even if links with remote system databases 116, 124 are severed due to maintenance or other network outage.

The biometric processor units 104, 112 are each connected with a remote processor unit 120 that connects with a first remote database 116. The remote processor unit 120 also connects with a second remote processor unit 122 that may be connected with an optional second remote database 124.

The second remote processor unit 122 may run a third party application, such as, e.g., the departure control system (DCS) for an airport. Information such as passenger name, flight number, time and gate number are automatically sent from the second remote database 124 to the first remote processor unit 120. Remote processing unit 120 then inspects the information and, if biometric data is not part of the record information, then the processor unit 120 uses one or more of the records to index into a biometric field in a record stored on the first remote database 116.

Remote processor 120 uses a set of rules that are either encoded in the information, or are pre-programmed into processor unit 120 to determine (i) to which local database 106, 114 a subset of the information should be sent via processor units 104, 112 based, for example, on gate information which uniquely identifies the locations of the biometric acquisition devices 102, 110, (ii) under what conditions and at what time the data should be sent to local databases 106, 114, and (iii) under what conditions and at what time the data should be automatically modified or deleted from local databases 106, 114.

For example, data may be transmitted from remote database 116 to local database 106 one hour before a particular flight and such data may be deleted when the flight has officially departed, if the second remote processor 122 is chosen to be a departure control system (DCS); or the data may be deleted once a user has actually passed through one of the biometric acquisition devices 102, 110.

Alternatively, a user 118 may be involved in an automatic process initiated by the second remote processor unit 122. For example, second remote database 124 may contain either fixed data fields (such as, e.g., a cell phone numbers of a user), or a variable data fields (such as, e.g., an itinerary number for a particular journey). User 118, who may be an actual user of the biometric system or their representative, then sends information to processor unit 120 using, e.g., a cell-phone call, text messaging system, or e-mail. The information sent can simply be the phone number from which a call was derived, using automatic reverse look-up methods that are known in the art, or the transmission of a number by text messaging.

Processor unit 120 then automatically compares the information sent by user 118 to the information sent by the second remote processor 122 to determine (i) which biometric record should be extracted from the database 116, (ii) to which local database 106, 114 the record should be sent, and (iii) under what conditions the record should be managed. This kind of user assistance may be desired if the applications running on the second remote processor unit 122 and first remote processor unit 120 are unable to guarantee that the number of active users that are being searched biometrically via a given acquisition device 102, 110 is larger than the ability of the system to identify an individual uniquely. In this case, the user's input provides additional information that the processor unit 120 (and, optionally, processor unit 122) can use to reduce the number of active users being searched at a given biometric device 102, 110.

Accordingly, large numbers of different users are allowed to pass through the biometric devices 102, 110 continually without the need for large databases situated locally with the devices. Only the relatively small databases 106, 114 are required locally. The arrangement of FIG. 2 has significant security benefits. For example, in case of theft of data or equipment locally, then only those records of a relatively small number of users may be affected.

While the foregoing represents preferred embodiments of the invention, it will be understood by those skilled in the art that various modifications and changes may be made without departing from the spirit and scope of the invention, and that the invention includes all such modifications and changes as come within the scope of the following claims.

We claim:

1. A method of modifying a first biometric database, comprising:
    storing biometric data corresponding to a number of individuals in a second biometric database;
    defining a subset of biometric records in the second biometric database by determining individuals scheduled to pass through a biometric acquisition device within a predefined time period, the determining being prior to the predefined time period, the biometric acquisition device linked with the first biometric database and located at or near one of: an airport entry, a passenger terminal, a passenger security gate and a building entry;
    transmitting, based on the determination and at a predetermined time prior to the predefined time period, the subset of biometric records associated with the predefined time period, to the first biometric database; and
    deleting or modifying one or more biometric records from the first biometric database at a time indicated by a rule, the indicated time being after the predefined time period.

2. The method of claim 1, wherein defining the subset comprises defining the subset based on a user dialing from a phone number, sending an email, sending a text message or entering information at a web page.

3. The method of claim 1, wherein defining the subset comprises defining the subset based at least in part on one or more of: a name or identifier of an individual, a flight number, a flight time, a gate number, an itinerary identifier and a location of the biometric acquisition device.

4. The method of claim 1, further comprising flagging the individual's biometric record for defining the subset based on one of: the individual's originating phone number, and an identifier associated with the individual or sent to the individual.

5. The method of claim 1, further comprising flagging the individual's biometric record for defining the subset based on an identifier sent to the individual via at least one of an email or a text message.

6. The method of claim 1, wherein transmitting the subset comprises transmitting the subset based on at least one rule specifying one or more of: a condition, a time, and a destination database for transmitting the subset.

7. The method of claim 1, further comprising deleting or modifying a first biometric record from the first biometric database responsive to a corresponding individual having passed the biometric acquisition device.

8. The method of claim 1, wherein deleting or modifying the one or more biometric records comprises deleting or modifying the one or more biometric records based on the rule, the rule indicating a condition and the time for deleting or modifying the one or more biometric records.

9. The method of claim 1, wherein deleting or modifying the one or more biometric records comprises deleting or modifying the one or more biometric records responsive to departure of a corresponding flight.

10. A system for modifying a biometric database, the system comprising:
    a first biometric database configured to store biometric records corresponding to a number of individuals; and
    a remote processor configured to:
        define a subset of the biometric records stored in the first biometric database by determining individuals scheduled to pass through a biometric acquisition device within a predefined time period, the determining being prior to the predefined time period, the biometric acquisition device linked with a second biometric database and located at or near one of: an airport entry, a passenger terminal, a passenger security gate and a building entry; and
        transmit, based on the determination and at a predetermined time prior to the predefined time period, the subset of biometric records associated with the predefined time period, to the second biometric database, wherein one or more biometric records from the second biometric database is deleted or modified at a time indicated by a rule, the indicated time being after the predefined time period.

11. The system of claim 10, wherein the remote processor is configured to define the subset based on a user dialing from a phone number, sending an email, sending a text message or entering information at a web page.

12. The system of claim 10, wherein the remote processor is configured to define the subset based at least in part on one or more of: a name or identifier of an individual, a flight number, a flight time, a gate number, an itinerary identifier and a location of the biometric acquisition device.

13. The system of claim 10, wherein the remote processor is configured to flag the individual's biometric record for defining the subset based on one of: the individual's originating phone number, and an identifier associated with the individual or sent to the individual.

14. The system of claim 10, wherein the remote processor is configured to flag the individual's biometric record for defining the subset based on an identifier sent to the individual via at least one of an email or a text message.

15. The system of claim 10, wherein the remote processor is configured to transmit the subset based on at least one rule specifying one or more of: a condition, a time, and a destination database for transmitting the subset.

16. The system of claim 10, wherein a first biometric record from the first biometric database is deleted or modified responsive to a corresponding individual having passed the biometric acquisition device.

17. The system of claim 10, wherein the one or more biometric records are deleted or modified based on the rule, the rule indicating a condition and the time for deleting or modifying the one or more biometric records.

18. The system of claim 10, wherein the one or more biometric records are deleted or modified responsive to departure of a corresponding flight.

* * * * *